W. S. Spratt.
Plow
No. 3,539. Reissued Jul. 6, 1869.
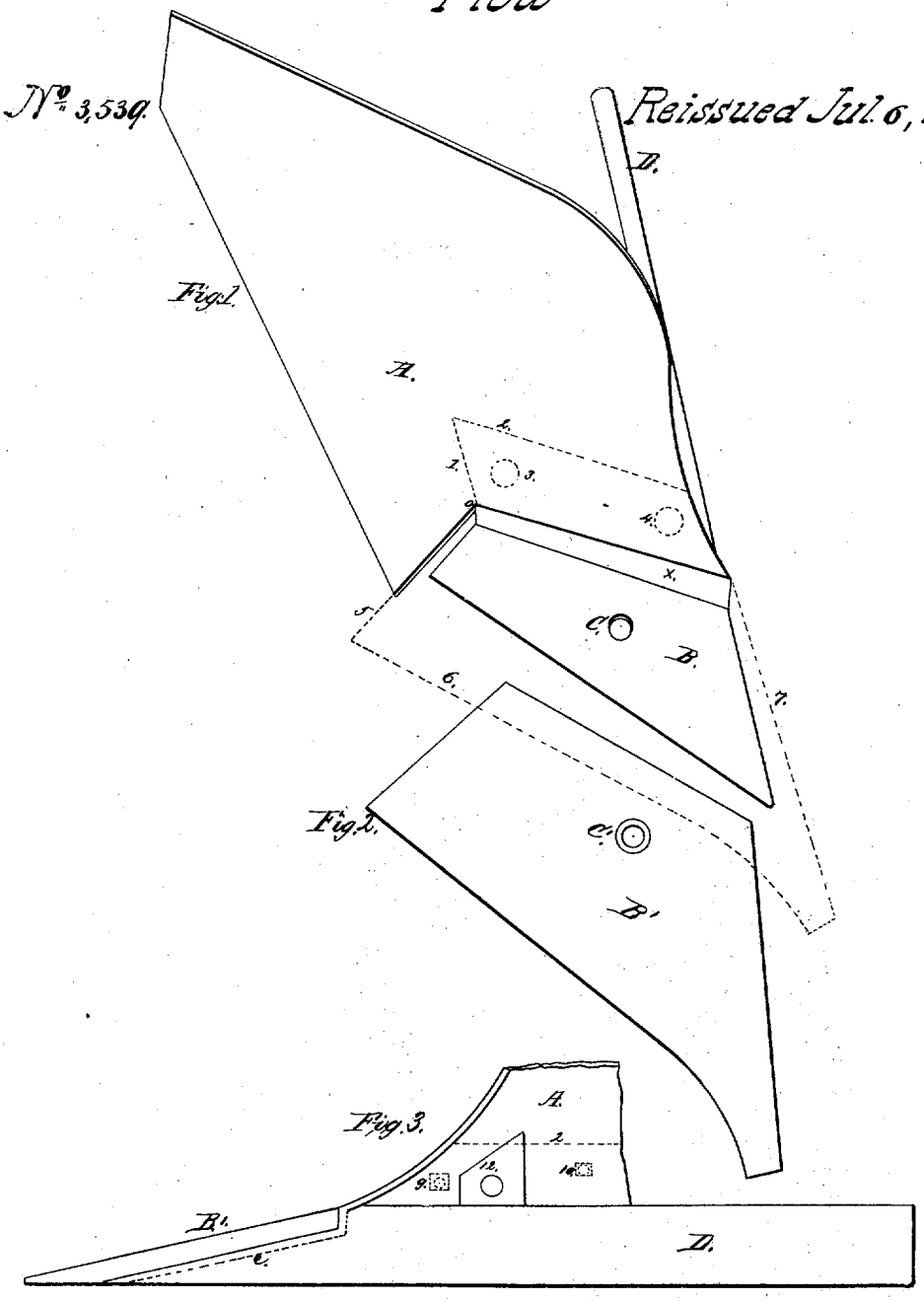
Witnesses:
James F. Johnston
A. F. Sprout
Inventor:
W. S. Spratt.
N. PETERS, PHOTO-LITHOGRAPHER, WASHINGTON, D. C.

UNITED STATES PATENT OFFICE.

WILLIAM S. SPRATT, OF WEST MANCHESTER, PENNSYLVANIA.

IMPROVEMENT IN PLOWS.

Specification forming part of Letters Patent No. 49,799, dated September 5, 1865; Reissue No. 3,539, dated July 6, 1869.

*To all whom it may concern:*

Be it known that I, WILLIAM S. SPRATT, of West Manchester, in the county of Allegheny and State of Pennsylvania, have invented a new and useful Improvement in Plows; and I do hereby declare that the following is a full, clear, and exact description thereof, reference being had to the accompanying drawings, and to the letters of reference marked thereon.

The nature of my invention consists in making a mold-board for steel plows with a bed for the plowshare, said mold-board and share-bed being made in one or more parts, with the landside welded, bolted, or riveted to the share-bed, the whole being constructed, arranged, and operating substantially in the manner hereinafter described.

To enable others skilled in the art to make and use my invention, I will proceed to describe its construction and operation.

In the accompanying drawings, Figure 1 represents a perspective view of my improvement. Fig. 2 represents a face view of the plowshare. Fig. 3 represents a side view of the landside and a section of the mold-board and plowshare.

In constructing my improved plow, I make the mold-board, plowshare, and landside in any of the known forms, and attach to them the ordinary appendages; but in forming the mold-board I take a sheet of cast-steel or wrought-iron of the desired thickness, and mark and cut it out to suit the form of mold-board desired. I then cut this plate of which I intend to make the mold-board to the point marked *o* on the line marked 5, and then, by means of die or other device, swage the mold-board into the form desired, with an offset or bed for the plowshare, as indicated by X and B in Fig. 1. The depth of the offset or bed for the plowshare should correspond to the thickness of the plowshare to be used. I then weld the landside to the offset or bed of the plowshare. The point at which the weld is made is indicated by the line marked *e* in Fig. 3. The plowshare-bed B and X can be made separate from the mold-board, as indicated by the dotted lines marked 1 and 2, and the mold-board A bolted or otherwise secured to the plowshare-bed, as indicated by the dotted lines marked 3 and 4 in Fig. 1, and marked 9 and 10 in Fig. 3. The dotted lines 5, 6, and 7 represent the plowshare in its relation to the mold-board and its bed or offset, (marked B and X.)

The lug (marked 12 in Fig. 3) is used for the purpose of securing an additional landside to the plow.

In order that the mechanic skilled in the art of making plows may more readily understand the relation of the several parts to each other, I will state that in the accompanying drawings A represents the mold-board. B and X represent the offset or bed for the plowshare. B′ represents the plowshare. C and C′ represent bolt-holes for the bolt used for securing the plowshare to its place. D represents the landside. Now, I wish it clearly understood that it is all important to weld the landside D to the offset or bed B and X, and to make a bed for the plowshare.

I am aware that beds or offsets have been made in plows made of cast-iron, and I am also aware that the same has been done in cast-iron blocks, to which mold-boards, landsides, and plowshares have been attached. Therefore I do not claim, broadly, an offset or bed for the plowshare.

Having thus described the nature, construction, and operation of my improvement, what I claim as of my invention is—

Making a mold-board for steel plows with a bed for the plowshare, said mold-board and share-bed being made in one or more parts, with the landside welded, bolted, or riveted to the share-bed, the whole being constructed and arranged substantially as herein described, and for the purpose set forth.

W. S. SPRATT.

Witnesses:
JAMES J. JOHNSTON,
ALEXANDER HAYS.